US010094068B2

United States Patent
Daniels et al.

(10) Patent No.: US 10,094,068 B2
(45) Date of Patent: Oct. 9, 2018

(54) BINDER FOR PAPER COATING COMPOSITIONS

(71) Applicant: WACKER CHEMICAL CORPORATION, Adrian, MI (US)

(72) Inventors: Christian Leonard Daniels, Fogelsville, PA (US); John Richard Boylan, Bethlehem, PA (US); Ronald Bernal Jones, Allentown, PA (US)

(73) Assignee: Wacker Chemical Corporation, Adrian, MI (US)

( * ) Notice: Subject to any disclaimer, the term of this patent is extended or adjusted under 35 U.S.C. 154(b) by 43 days.

(21) Appl. No.: 15/128,759

(22) PCT Filed: Mar. 27, 2015

(86) PCT No.: PCT/US2015/022923
§ 371 (c)(1),
(2) Date: Sep. 23, 2016

(87) PCT Pub. No.: WO2015/148888
PCT Pub. Date: Oct. 1, 2015

(65) Prior Publication Data
US 2017/0175335 A1 Jun. 22, 2017

Related U.S. Application Data

(60) Provisional application No. 61/971,257, filed on Mar. 27, 2014.

(51) Int. Cl.
| | |
|---|---|
| *D21H 19/60* | (2006.01) |
| *C08F 218/08* | (2006.01) |
| *C08F 220/06* | (2006.01) |
| *C08F 220/10* | (2006.01) |
| *C09D 4/00* | (2006.01) |
| *C08F 220/14* | (2006.01) |
| *C08F 230/08* | (2006.01) |
| *C09D 131/04* | (2006.01) |
| *D21H 19/58* | (2006.01) |

(52) U.S. Cl.
CPC .......... *D21H 19/60* (2013.01); *C08F 218/08* (2013.01); *C08F 220/06* (2013.01); *C08F 220/10* (2013.01); *C08F 220/14* (2013.01); *C08F 230/08* (2013.01); *C09D 4/00* (2013.01); *C09D 131/04* (2013.01); *D21H 19/58* (2013.01)

(58) Field of Classification Search
CPC ..... C09D 131/04; C08F 218/08; C08F 230/08
See application file for complete search history.

(56) References Cited

U.S. PATENT DOCUMENTS

| | | | |
|---|---|---|---|
| 3,337,482 A | 8/1967 | Watanabe | |
| 3,404,112 A | 10/1968 | Lindemann | |
| 3,642,680 A | 2/1972 | Edmund | |
| 3,812,072 A | 5/1974 | Kuhlkamp | |
| 4,395,499 A | 7/1983 | Rosenski | |
| 4,503,185 A | 3/1985 | Hausman | |
| 6,908,524 B2 | 6/2005 | Goldstein | |
| 9,803,101 B2* | 10/2017 | Choi | C09D 131/04 |
| 2007/0244238 A1 | 10/2007 | Desor | |
| 2012/0021237 A1 | 1/2012 | Confalone | |
| 2013/0130025 A1* | 5/2013 | Farwaha | C09D 131/04 |
| | | | 428/342 |
| 2016/0251801 A1* | 9/2016 | Sagl | D06N 7/0073 |
| | | | 428/95 |
| 2016/0289512 A1* | 10/2016 | Bauers | C08F 218/08 |
| 2017/0107394 A1* | 4/2017 | Choi | C09D 131/04 |
| 2017/0175335 A1* | 6/2017 | Daniels | D21H 19/60 |

FOREIGN PATENT DOCUMENTS

| | | |
|---|---|---|
| EP | 0140227 | 10/1984 |
| EP | 0381379 | 8/1990 |
| EP | 0432391 | 6/1991 |
| EP | 1916275 | 4/2008 |
| JP | 06220134 | 8/1994 |
| WO | 2013074902 | 5/2013 |
| WO | 2014036740 | 3/2014 |

OTHER PUBLICATIONS

International Search Report and Written Opinion for International Application PCT/US2015/022923, dated Jul. 2, 2015, 10 pages.
International Preliminary Report on Patentability for International Application No. PCT/US2015/022923, dated Sep. 29, 2015, 23 pages.
Fox T.G., Bull. Am. Physics Soc. 1, 3, p. 123, 1956.
Polymer Handbook, 2nd edition, J. Wiley & Sons, New York (1975).

* cited by examiner

*Primary Examiner* — Michael A Salvitti
(74) *Attorney, Agent, or Firm* — RatnerPrestia

(57) ABSTRACT

The invention provides a polymer dispersion for paper coating compositions, obtainable by means of a radically initiated, aqueous emulsion polymerization in the presence of one or more emulsifiers and optionally protective colloids, of a) 50 to 93% by weight of at least one vinyl ester of an alkanoic acid with 1 to 12 C-atoms, whose homopolymer has a glass transition temperature Tg of below about 350° K, b) 2 to 30% by weight of ethylene, c) 5 to 20% by weight of at least one monomer whose homopolymer has a glass transition temperature Tg of at least about 350° K, d) 0.1 to 2% by weight of ethylenically unsaturated silane monomers, e) 0 to 5% by weight of further ethylenically unsaturated monomers that are copolymerizable with vinyl acetate and ethylene, based in each case on the total weight of the monomers used for the polymerization, with the data in % by weight summing in each case to 100% by weight.

8 Claims, No Drawings

BINDER FOR PAPER COATING COMPOSITIONS

CROSS REFERENCE TO RELATED APPLICATIONS

This application is the National Phase filing of International Patent Appln. No. PCT/US2015/022923, filed 27 Mar. 2015, and claims priority benefit of U.S. provisional patent application No. 61/971,257, filed 27 Mar. 2014, the entirety of which applications are incorporated herein by reference.

FIELD OF THE INVENTION

The invention relates to paper coating compositions having improved pick performance.

BACKGROUND OF THE INVENTION

Paper coating compositions are used in paper industry to provide various physical properties to paper. Generally paper is coated with paper coatings to improve the printability, and to improve smoothness and gloss of the paper surface, and in particular to improve whiteness. Such paper coatings generally comprise an aqueous polymer dispersion, one or more pigments and other additives typically used in paper coating formulations. In addition to copolymers of styrene and butadiene and copolymers of styrene and acrylic acid ester, paper coating compositions with copolymers of vinyl acetate and ethylene (VAE) have become important.

During the offset printing process on coated paper, high levels of stress are experienced by the coating layer. This is a result of the increasing tack force developed by the ink layer as it loses its oil-based vehicle into the pore structure of the coating. When the tack force develops too quickly, or the coating strength is inadequate, the phenomenon of "dry pick" is observed, in which fragments of coating are removed by the ink. Additionally, in non-image areas of the print where aqueous fountain solution has been applied, the coating is weakened and subsequent printing with ink can cause removal of fragments of the coating, a phenomenon known as "wet pick".

In consequence, in addition to the above mentioned basic qualities required in paper coatings, the paper coating must have high pick strength, to permit subsequent printing on the coated paper without "picking". In particular, the paper coating must have sufficient wet pick strength. Known binders based on vinyl acetate ethylene copolymers do not show the desired wet pick strength.

U.S. Pat. No. 3,337,482 discloses a paper coating composition comprising a vinyl acetate ethylene copolymer with 2 to 30% of ethylene and 0 to 5% of an ethylenically unsaturated carboxylic acid. According to this patent, dry picking becomes too great if more than 30% of ethylene is copolymerized.

U.S. Pat. No. 3,642,680 discloses a paper coating composition with improved pick strength, which is obtained by polymerizing ethylene and vinyl acetate in the presence of an acrylic seed.

U.S. Pat. No. 3,404,112 describes a paper coating composition with good dry pick characteristics. An aqueous dispersion of a crosslinked vinyl acetate ethylene triallyl cyanurate terpolymer is used as binder.

In U.S. Pat. No. 3,812,072 vinyl acetate ethylene copolymer dispersions are used in paper coating compositions. Graft copolymers of vinyl ester on polyalkylene oxides are added to the paper coating compositions to improve compatibility of the vinyl acetate ethylene copolymer with further ingredients of the paper coating composition. Coating compositions comprising such graft copolymers had better dry pick strength.

High strength pigment binders for paper coatings are disclosed in U.S. Pat. No. 4,395,499. The latex binder comprises a polymer of vinyl ester, a polyethylenically unsaturated comonomer, an ethylenically unsaturated carboxylic acid, and optionally an alkyl acrylate. Picking is not discussed in this patent.

In U.S. Pat. No. 4,503,185 improvement of dry pick strength of a paper coating composition is achieved by copolymerizing vinyl acetate and ethylene with dicyclopentadienyl acrylate. Dry pick strength is drastically improved due to the crosslinking activity of the dicyclopentadlenyl groups, but wet pick strength remained unchanged.

In EP 0140227 A2 a pigmented paper coating composition is disclosed which comprises an aqueous polymer dispersion of vinyl acetate ethylene copolymers with copolymerized silane-functional comonomers and at least one comonomer selected from carboxyl-functional comonomers, amide-functional comonomers and polyethylenically unsaturated comonomers. These copolymers impart improved dry pick strength.

The subject of JP 06-220134 A2 is a paper/fiber treating agent with excellent storage stability and flame retardancy, obtained by copolymerizing ethylene, vinyl chloride and vinyl acetate in the presence of protective colloid and a mix of anionic and nonionic emulsifiers.

EP 0432391 A2 concerns an emulsion binder for carpet comprising an emulsion polymer of vinyl ester, ethylene and a comonomer having a Tg of at least 50° C. The high Tg comonomer improves dry tuft binding properties of backed carpets.

EP 0381379 B1 discloses a process of offset lithographic printing of paper wherein the paper is coated with a coating composition comprising an emulsion of a copolymer of a lower vinyl ester, ethylene, and a vinyl ester of an alpha-branched monocarboxylic acid such as VeoVa 9®.

WO 2013/074902 A1 discloses blends of a vinyl acetate ethylene latex dispersion and a second latex dispersion with styrene butadiene copolymer or styrene acrylic acid ester copolymer. Paper coating compositions containing blends of this type exhibit higher dry pick strength than each of the components alone.

US 2012/0021237 A1 discloses an alkylphenol ethoxylate-free paper coating emulsion comprising a copolymer of vinyl acetate, ethylene, unsaturated carboxylic acid and polyethylenically unsaturated comonomer.

WO 2013/074902 teaches improvement of dry pick resistance of paper coatings based on silane-functional VAEs by copolymerizing ionic comonomers selected from unsaturated sulfonic acids/sulfonates and/or unsaturated phosphonic acids/phosphates.

It was therefore an object to provide an improved vinyl ester ethylene latex dispersion that imparts high wet pick strength into paper coating compositions.

SUMMARY OF THE INVENTION

The invention provides a polymer dispersion for paper coating compositions, obtainable by means of a radically initiated, aqueous emulsion polymerization in the presence of one or more emulsifiers and optionally protective colloids, of a) 50 to 93% by weight of at least one vinyl ester of an alkanoic acid with 1 to 12 C-atoms, whose homopolymer has a glass transition temperature Tg of below about 350° K (78° C.), according to ASTM D3418-82 at a heating rate of 10° K (10° C.) per minute, taking the midpoint temperature as Tg,
  b) 2 to 30% by weight of ethylene,
  c) 5 to 20% by weight of at least one monomer whose homopolymer has a glass transition temperature Tg of at least about 350° K (78° C.), according to ASTM D3418-82 at a heating rate of 10° K (10° C.) per minute, taking the midpoint temperature as Tg,
  d) 0.1 to 2% by weight of ethylenically unsaturated silane monomers,
  e) 0 to 5% by weight of further ethylenically unsaturated monomers different from monomers c) or d) that are copolymerizable with vinyl acetate and ethylene,
based in each case on the total weight of the monomers used for the polymerization, with the data in % by weight summing in each case to 100% by weight.

The invention also provides methods of using the polymer dispersion in a paper coating composition. For example, the invention also provides a coating composition including pigments and the polymer dispersion, wherein the polymer constitutes from 1 to 50% by weight of the solids in the composition, and the pigment(s) constitute(s) from 50 to 99% by weight of the solids in the composition.

The invention also provides a process for preparing a polymer dispersion, including radically initiated, aqueous emulsion polymerization, without the use of seed latex, in the presence of one or more emulsifiers and optionally protective colloids, of
  a) 50 to 93% by weight of at least one vinyl ester of an alkanoic acid with 1 to 12 C-atoms, whose homopolymer has a glass transition temperature Tg of below about 350° K (78° C.), according to ASTM D3418-82 at a heating rate of 10° K (10° C.) per minute, taking the midpoint temperature as Tg,
  b) 2 to 30% by weight of ethylene,
  c) 5 to 20% by weight of at least one monomer whose homopolymer has a glass transition temperature Tg of at least about 350° K (78° C.), according to ASTM D3418-82 at a heating rate of 10° K (10° C.) per minute, taking the midpoint temperature as Tg,
  d) 0.1 to 2% by weight of ethylenically unsaturated silane monomers,
  e) 0 to 5% by weight of further ethylenically unsaturated monomers different, from monomers c) or d) that are copolymerizable with vinyl acetate and ethylene,
based in each case on the total weight of the monomers used for the polymerization, with the data in % by weight summing in each case to 100% by weight;
wherein at least a part of the emulsifiers and/or protective colloids, and at least a part of the comonomers a), b), c), d) and e) is added initially, and the reaction mixture is heated and polymerization is initiated by metering initiator components, and the remaining part of the comonomers is added during polymerization.

DETAILED DESCRIPTION OF THE INVENTION

Polymer Composition

The polymers in the polymer dispersions of the invention include units of vinyl esters of an alkanoic acid with 1 to 12 C-atoms, whose homopolymer has a glass transition temperature Tg of below about 350° K (78° C.). Non-limiting examples are vinyl acetate, vinyl propionate, vinyl valerate, vinyl 2-ethylhexanoate, vinyl laurate, vinyl versatates, and mixtures thereof. Vinyl versatates are vinyl esters of alpha-branched monocarboxylic acids, for example VeoVa 9® or VeoVa 10® (tradenames of Momentive), which have 0.9 and 10 C-atoms respectively in the carboxylic acid moiety. A preferred vinyl ester monomer is vinyl acetate. The vinyl ester monomer a) is copolymerized in general in an amount of 50 to 93% by weight, preferably 70 to 90% by weight, based in each case on the total weight of the monomers.

Ethylene is copolymerized in general in an amount of 2 to 30% by weight, preferably 5 to 15% by weight, based in each case on the total weight of the monomers.

The polymers include monomer(s) c) whose homopolymer has a glass transition temperature Tg of at least about 350° K (78° C.). Non-limiting examples of monomers c) are well-known and are disclosed for example in Polymer Handbook, 2nd edition, J. Wiley & Sons, New York (1975). In general these include vinyl esters, acrylic acid esters, methacrylic acid esters, vinyl chloride and styrene. Non-limiting examples of monomers c) are, isobornyl acrylate (Tg=367° K=95° C.), 2-naphthyl acrylate (Tg=358° K=86° C.), t-butyl methacrylate (Tg=391° K=119° C.), 2-OH-ethyl methacrylate (Tg=359° K=87° C.), isobornyl methacrylate (Tg=383° K=111° C.), Isopropyl methacrylate (Tg=354° K=82° C.), methyl methacrylate (Tg=378° K=106° C.), phenyl methacrylate (Tg=383° K=111° C.), vinyl pivalate (Tg=359° K=87° C.), vinyl chloride (Tg=354° K=82° C.), styrene (Tg=373° K=101° C.), and 2-norbornyl methacrylate (Tg=416° K=144° C.). Preferred monomers c) are isobornyl acrylate and methyl methacrylate. The "hard" monomer c) is copolymerized in general in an amount of 5 to 20% by weight, preferably 5 to 15% by weight, based in each case on the total weight of the monomers. In some embodiments, vinyl chloride and/or styrene may be excluded as comonomers for making the copolymer.

Examples of ethylenically unsaturated silane monomers d) are monomers of the general formula $R^1SiR_{0-2}(OR^2)_{1-3}$, where R is a $C_1$ to $C_3$ alkyl radical, $C_1$ to $C_3$ alkoxy radical or halogen (e.g., Cl or Br), $R^1$ is $CH_2=CR^3-(CH_2)_{0-1}$ or $CH_2=CR^3CO_2(CH_2)_{1-3}$, $R^2$ is a unbranched or branched, optionally substituted alkyl radical or acyl radical having 1 to 12 C atoms, which may optionally be interrupted by an ether group, and $R^3$ is H or $CH_3$. Preference is given to 3-acryloyl- and 3-methacryloyloxypropyltri(alkoxy)silanes, vinylalkyldialkoxysilanes and vinyltrialkoxysilanes, wherein the alkoxy groups comprise $C_1$ to $C_{12}$ alkoxy groups and the alkyl radicals are $C_1$ to $C_3$ radicals. Examples of suitable $C_1$ to $C_{12}$ alkoxy groups include methoxy, ethoxy, $CH_3O(CH_2)_2O$, $CH_3CH_2O(CH_2)_2O$, methoxypropylene glycol ether and/or ethoxypropylene glycol ether radicals.

Particularly preferred ethylenically unsaturated silane monomers are vinyltrimethoxysilane, vinyltriethoxysilane, vinyltripropoxysilane, vinyltriisopro-poxysilane, vinyltributoxysilane, vinyltriacetoxysilane, 3-methacryloyloxypropyltrimethoxysilane, 3-methacryloyloxypropyltriethoxysilane, vinyltrichlorosilane, vinylmethyldichlorosilane, vinylmethyldichlorosilane, methoxyethoxysilane) and trisacetoxyvinylsilane. Most preferred are vinyltrimethoxysilane, vinyltriethoxysilane, 3-methacryloyloxypropyltrimethoxysilane, and 3-methacryloyloxypropyltriethoxysilane.

The fraction of ethylenically unsaturated silane monomers is preferably 0.05 to 5% by weight, more preferably 0.1% to 1% by weight, based in each case on the total weight of the monomers.

In some embodiments, 0.05% to 5% by weight of auxiliary comonomers e) may optionally be copolymerized, based on the total weight of the comonomers. Examples of auxiliary comonomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric acid and maleic acid, e.g., the diethyl and diisopropyl esters; and also, maleic anhydride, ethylenically unsaturated sulfonic acids and/or salts thereof, preferably vinylsulfonic acid, 2-acylamido-2-methylpropanesulfonic acid.

To adjust certain polymer properties, for example crosslinking, certain other auxiliary comonomers e) may be copolymerized. These may include precrosslinking comonomers, for example polyethylenically unsaturated comonomers. Specific examples include monomers with two ethylenically unsaturated units, for example divinyl adipate, diallyl maleate, allyl methacrylate, and diallyl phthalate, or three ethylenically unsaturated units, e.g., triallyl cyanurate. Postcrosslinking comonomers may also or instead be included. Examples include acrylamidoglycolic acid (AGA), methyl-acrylamidoglycolic acid methyl ester (MAGME), N-methylolacrylamide (NMA), N-methylolmethacrylamide (NMMA), N-methylolallylcarbamate, and alkyl ethers (e.g., the isobutoxy ether) or esters of N-methylolacrylamide or of N-methylolmethacrylamide or of N-methylolallylcarbamate.

Other examples of auxiliary comonomers e) are ethylenically unsaturated compounds containing epoxide groups. Examples include glycidyl methacrylate, glycidyl acrylate, allyl glycidyl ether, vinyl glycidyl ether, vinylcyclohexane oxide, limonene oxide, myrcene oxide, caryophyllene oxide, and styrenes, vinyltoluenes and/or vinyl benzoates each having a glycidyl radical substituent on the aromatic moiety.

In some embodiments, one or more of the above-mentioned auxiliary monomers may be excluded as comonomers. In a preferred embodiment, the polymer does not contain monomer units from the group consisting of precrosslinking comonomers, postcrosslinking comonomers and comonomers containing epoxide groups. In some embodiments, no monomers containing N-methylol substituents are copolymerized. In some embodiments, no monomers containing dicyclopentadienyl groups are copolymerized. In some embodiments, no butadiene is copolymerized.

The monomer selection and the selection of the weight fractions of the comonomers are preferably such that the polymer has a glass transition temperature Tg of 0° C. to 30° C. The glass transition temperature Tg of the polymers can be determined by known methods using differential scanning calorimetry (DSC), for example according to ASTM D3418-82 at a heating rate of 10° K per minute, taking the midpoint temperature as Tg. The Tg may also be calculated approximately in advance using the Fox equation. According to Fox T. G., Bull. Am. Physics Soc. 1, 3 page 123 1956) the following is the case: $1/Tg=x1/Tg1+x2/Tg2+ \ldots +xn/Tgn$, where xn stands for the mass fraction (% by weight/100) of the monomer n, and Tgn is the glass transition temperature, in kelvins, of the homopolymer of the monomer n. Tg values for homopolymers are listed in Polymer Handbook, 2nd edition, 3. Wiley & Sons, New York (1975).

Preparing the Polymer

The vinyl ester ethylene copolymers are produced via an aqueous, radically initiated emulsion polymerization using conventional emulsion polymerization procedure. Such a procedure is described for many time and known to the skilled person, for example in Encyclopedia of Polymer Science and Engineering, Vol. 8 (1987), John Wiley & Sons, pages 659 to 677 or for example in EP 1916275 A1. In general the polymerization takes place in pressure reactors at a temperature of 50° C. to 120° C. under a pressure of 10 to 90 bar absolute.

The polymerization is in general initiated using one of the redox initiator combinations customarily used for emulsion polymerization. Examples of suitable oxidation initiators are the sodium, potassium, and ammonium salts of peroxodisulfuric acid, hydrogen peroxide, t-butyl hydroperoxide, cumene hydroperoxide, isopropylbenzene monohydroperoxide. Preference is given to the sodium, potassium, and ammonium salts of peroxodisulfuric acid and to hydrogen peroxide. The stated initiators are used in general in an amount of 0.01% to 2.0% by weight, based on the total weight of the monomers. The forgoing oxidizing agents, for example salts of peroxodisulfuric acid, may also be used on their own as thermal initiators.

Suitable reducing agents are the ammonium or alkali metal sulfites or bisulfites, for example sodium sulfite; derivatives of sulfoxylic acid, e.g., zinc sulfoxylates, or alkali metal formaldehyde sulfoxylates, for example sodium hydroxymethanesulfinate (Bruggolit); and (iso)ascorbic acid. In some embodiments it is preferred to use sodium hydroxymethanesulfinate or sodium sulfite. In other embodiments an ascorbic or erythorbic family member is used, such as sodium erythorbate. The amount of reducing agent is preferably 0.015% to 3% by weight, based on the total weight of the monomers.

Molecular weight regulators may be used during the polymerization. If used, they are employed typically in amounts between 0.01% to 5.0% by weight, based on the total weight of the monomers to be polymerized, and are metered separately or as a premix with the reaction components. Examples of molecular weight regulators include n-dodecyl mercaptan, tert-dodecyl mercaptan, mercaptopropionic acid, methyl mercaptopropionate, isopropanol, and acetaldehyde. It is preferred not to use any regulating substances.

Nonionic emulsifiers and/or anionic emulsifiers may be used to stabilize the emulsion during and after polymerization. Protective colloids may optionally be included along with the emulsifiers. Typically, no cationic emulsifiers, no cationic protective colloids, and/or no alkylphenol ethoxylates are included before, during or after the polymerization. In some embodiments, coating compositions made with the copolymer do not contain any cationic emulsifiers, cationic protective colloids, and/or alkylphenol ethoxylates.

Examples of suitable nonionic emulsifiers include acyl, alkyl, oleyl, and alkylaryl ethoxylates. These products are available commercially, for example, under the name Genapol® or Lutensol®. They include ethoxylated mono-, di-, and tri-alkylphenols, preferably having a degree of ethoxylation of 3 to 50 ethylene oxide units and $C_4$ to $C_{12}$ alkyl radicals, and also ethoxylated fatty alcohols, preferably having a degree of ethoxylation of 3 to 80 ethylene oxide units and $C_8$ to $C_{36}$ alkyl radicals. Suitable nonionic emulsifiers are also $C_{13}$-$C_{15}$ oxo-process alcohol ethoxylates having a degree of ethoxylation of 3 to 30 ethylene oxide units, $C_{16}$-$C_{18}$ fatty alcohol ethoxylates having a degree of ethoxylation of 11 to 80 ethylene oxide units, $C_{10}$ oxo-process alcohol ethoxylates having a degree of ethoxylation of 3 to 11 ethylene oxide units, $C_{13}$ oxo-process alcohol ethoxylates having a degree of ethoxylation of 3 to 20 ethylene oxide units, polyoxyethylenesorbitan monooleate having 20 ethylene oxide groups, copolymers of ethylene oxide and propylene oxide with a minimum content of at least 10% by weight of ethylene oxide, polyethylene oxide ethers of oleyl alcohol, having a degree of ethoxylation of 4 to 20 ethylene oxide units, and also the polyethylene oxide ethers of nonylphenol having a degree of ethoxylation of 4 to 20 ethylene oxide units.

Particularly preferred are $C_{12}$-$C_{14}$ fatty alcohol ethoxylates having a degree of ethoxylation of 3 to 20 ethylene oxide units.

Examples of suitable anionic emulsifiers include sodium, potassium, and ammonium salts of straight-chain aliphatic carboxylic acids having 12 to 20 C atoms; sodium hydroxyoctadecanesulfonate; sodium, potassium, and ammonium salts of hydroxyl-fatty acids having 12 to 20 C atoms and the sulfonation and/or acetylation products thereof; sodium, potassium, ammonium and triethanolamine salts of alkyl sulfate, and sodium, potassium, and ammonium salts of alkylsulfonates having in each case 10 to 20 C atoms and of alkylarylsulfonates having 12 to 20 C atoms; sodium, potassium, and ammonium salts of sulfosuccinic esters with aliphatic saturated monohydric alcohols having 4 to 16 C atoms, and sulfosuccinic 4-esters with polyethylene glycol ethers of monohydric aliphatic alcohols having 10 to 12 C atoms, more particularly their disodium salts, and of sulfosuccinic 4-ester with polyethylene glycol nonylphenyl ether, more particularly its disodium salt, and of biscyclohexyl sulfosuccinate, more particularly its sodium salt; ligninsulfonic acid and also its calcium, magnesium, sodium, and ammonium salts; resin acids and also hydrogenated or dehydrogenated rosin acids and their alkali metal salts.

The most preferred anionic emulsifiers are the sodium, potassium, and ammonium salts of alkyl sulfates and of alkylsulfonates having in each case 10 to 20 C atoms, and of alkylarylsulfonates having 12 to 20 C atoms, and of sulfosuccinic esters with aliphatic saturated monohydric alcohols having 4 to 16 C atoms.

The amount of emulsifier(s) in total is typically 3% to 12.5% by weight, preferably 3% to 7% by weight, based in each case on the total weight of the monomers.

Suitable protective colloids include polyvinyl alcohols; polyvinyl acetals; polyvinylpyrrolidones; polysaccharides in water-soluble form, e.g., starches (amylase and amylopectin), celluloses and their carboxymethyl, methyl, hydroxyethyl, hydroxypropyl derivatives; proteins, e.g., casein or caseinate, soya protein, gelatine; lignosulfonates; synthetic polymers, e.g., poly(meth)acrylic acid, copolymers of (meth)acrylates with carboxyl-functional comonomer units, poly(meth)acrylamide, polyvinylsulfonic acids and the water-soluble copolymers thereof, melamine-formaldehyde sulfonates, naphthalene-formaldehyde sulfonates, styrene-maleic acid copolymers and vinyl ether-maleic acid copolymers.

Preference is given to using partially hydrolyzed or fully hydrolyzed polyvinyl alcohols, more preferably those from the group of the partially hydrolyzed polyvinyl alcohols having a degree of hydrolysis of 8.0 to 95 mol % and a Floppier viscosity, in 4% strength aqueous solution, of 1 to 30 mPas (method of Höppler at 20° C., DIN 53015).

In a preferred embodiment protective colloids are used in an amount of 0.1 to 1% by weight, based on the total weight of monomers. Most preferred is to use only emulsifier and no protective colloid.

The polymerization can be carried out discontinuously or continuously, without the use of seed latexes, with initial introduction of all the constituents or individual constituents of the reaction mixture, or with initial introduction of a portion and subsequent metering of the constituents or individual constituents of the reaction mixture, or by the metering method without an initial mixture. All the meterings are preferably carried out at the rate of consumption of the particular component.

For example, at least a part of the surfactants and at least a part of the comonomers a), b), c), d) and e) is added initially. The reaction mixture is heated and polymerization is initiated by metering the initiator components. The remaining part of the comonomers can be added during polymerization. Alternatively, comonomers c) can be added in form of a seed latex comprising at least a part of the comonomers c). A further alternative is to polymerize monomers c) after finalization of the polymerization of the other comonomers, optionally in a second reactor. With both alternatives a copolymer phase is obtained with a high concentration of monomer units c)

After conclusion of the polymerization, a post-polymerization can be carried out according to known methods to remove residual monomers, in general by post-polymerization initiators using a redox catalyst. Volatile residual monomers can also be removed by means of distillation, preferably under reduced pressure, and, if appropriate, passing inert entraining gases such as air, nitrogen or steam through or over the reaction mixture.

The aqueous copolymer dispersions obtained in this way have a solids content of from 30 to 75% by weight, preferably from 50 to 60% by weight.

The particles of the copolymer dispersion have a small/narrow particle size distribution having a mean particle size less than 1 μm, typically in a range from 0.1 to 0.3 μm. This particle size provides good paper coating rheology and a high surface area for pigment-to-pigment and pigment-to-paper binding strength.

Coating Composition Formulation

Paper coatings using the binders disclosed herein may be prepared according to formulation principles generally known in the art. Unless otherwise indicated, the proportion of formulation components in the paper coatings described herein is expressed relative to 100 parts of pigment. Suitable pigments include polymeric pigments, aluminosilicates (for example clay or kaolin), calcium carbonate, titanium dioxide, talc, barium sulfate, zinc oxide, aluminum trihydrate, amorphous silica and silicates. Preferably kaolin and/or calcium carbonate. The polymeric binder constitutes from 1 to 50% by weight of the solids in the composition, more typically 3 to 22% by weight. The pigment(s) constitute(s) from 50 to 99% by weight of the solids in the composition, more typically 78 to 97% by weight.

Other components of the formulation may include dispersants, e.g., sodium polyacrylates; lubricants, e.g., fatty acid salts (e.g., stearates); optical brighteners, e.g., diaminostilbene disulfonic acid derivatives; cobinders; defoamers; preservatives and water.

In some embodiments, the coating compositions may exclude polyethylene oxide and/or polypropylene oxide polymers that have been grafted with vinyl esters.

To prepare the paper coating compositions, the pigment is added as an aqueous pigment slurry and mixed with the binder dispersion, the other additives and water.

The total solids content of the paper coating composition is typically at least 45 wt %, at least 50 wt %, at least 55 wt %, or at least 60 wt %. It is typically at most 75 wt %, or at most 73 wt %, or at most 71 wt %, at most 69 wt %, or at most 67 wt %. The Brookfield RV viscosity at 23° C. and 20 rpm, #4 spindle is typically at least 500 cPs, or at least 1000 cPs, or at least 1500 cPs, or at least 2000 cPs. It is typically at most 5000 cPs, or at most 4500 cPs, or at most 4000 cPs, or at most 3500 cPs, or at most 3000 cPs.

Coating Composition Application

The paper coating composition may be applied to the substrate with any of the usual coating devices, such as blade coaters, roll coaters, air knife coaters, rod coaters and scrapers. Any support material may be coated, and typical suitable support materials include paper and cardboard.

The paper coating compositions of the invention are may be used to cover one or both sides of a substrate either partially or entirely. Typically one or both sides are covered entirely. The compositions may further include polymeric dispersions other than the above-described vinyl ester ethylene copolymers, for example vinyl acrylics, styrene butadiene, acrylics, vinyl acetate homopolymers, and the like. In some embodiments, however, any one or more of these may be excluded from the coating composition.

Paper coating formulations made with the polymer dispersions of the present invention show remarkably improved wet pick. The IGT Wet Pick is typically <15%, preferably 0-10%, more preferably less than 1.0%, still more preferably less than 0.1%, and most preferably 0%.

EXAMPLES

Dispersion 1:

An emulsifier-stabilized vinyl acetate ethylene copolymer dispersion was prepared with 79% b.w. vinyl acetate units, 9% b.w. ethylene units, 10% b.w. methyl methacrylate units, 0.75% b.w. acrylic acid units, 0.75% b.w. of vinyltrimethoxysilane units and 0.5% b.w. 2-acrylamido-2-methylpropane sulfonic acid (AMPS®, available from Lubrizol) units.

The autoclave was charged with 845 g of water, 8.4 g of Aerosol MA-80I (dihexyl sulfosuccinate supplied by Cytec), 0.5 g of sodium acetate, 5.0 g of a 1% solution of ferrous ammonium sulfate. The pH of the charge was adjusted to 4.2 with 1.1 g of acetic acid. Agitation was begun and 215 g of vinyl acetate was charged. After the initial charging, the reactor was purged with nitrogen followed by a purge with ethylene and heated under agitation to 55° C., then 175 g of ethylene was charged. To initiate polymerization a solution of 4.5% b.w. sodium persulfate and 1.3 b.w. sodium bicarbonate was fed at 0.5 g/min and a 2.7% solution of sodium erythorbate was also feed at 0.5 g/min. Upon evidence of an exotherm reaction, two additional feeds were begun: 1233 g of vinyl acetate mixed with 192 g methyl methacrylate was added over 120 minutes and a aqueous feed consisting of 234.5 g water, 25.1 g of Pluronic L-64 (ethylene oxide/propylene oxide block copolymer supplied by BASF), 16.8 g of Rhodafac RS-610 (supplied by Solvay) 16.8 g of Lubrizol 2403 (50% solution of the sodium salt of acrylamido methyl propane sulfonic acid supplied by Lubrizol, AMPS), 12.6 g acrylic acid, 5.0 g of 50% sodium hydroxide and 12.6 g Geniosil XL10 (vinyl trimethoxysilane supplied by Wacker) was fed uniformly over 120 minutes. When the monomer feeds were begun, the temperature was ramped from 55° C. to 85° C. over 30 minutes and then held at 85° C. for the remainder of the reaction.

The addition rates of the sodium persulfate and sodium erythorbate solutions were adjusted over time in an effort to obtain a uniform conversion profile. Both of these additions were terminated 160 minutes after the initial exotherm was observed, when 320 g of each solution had been added.

The contents were then cooled to 35° C. then transferred to a 3 gallon autoclave where vacuum was used to remove any unreacted ethylene. At this point 2 g of Rhodaline™ 670 (a proprietary defoamer composition supplied by Solvay) was added to reduce foaming, followed by 2 g of sodium erythorbate in 20 g of water, then 2 g of t-butyl hydroperoxide (70% in water) in 10 g of water. The contents were allowed to mix for 15 minutes and were then removed.

The physical properties of the resultant latex were:

| | |
|---|---|
| % non-volatile | 49.3 |
| Tg | 15.4° C. |
| Viscosity | 62 cps (Brookfield LVF viscometer 60 rpm, 23° C.) |
| pH | 4.8 |
| coagulum | <0.01% (100 mesh screen) |

These and all other Brookfield LVF runs herein at 60 rpm and 23° C. used a #3 spindle.

Dispersion 2:

An emulsifier-stabilized vinyl acetate ethylene copolymer dispersion was prepared with 74% b.w. vinyl acetate units, 9% b.w. ethylene units, 15% b.w. isobornyl acrylate units, 0.75% b.w. acrylic acid units 0.5% b.w. AMPS units, and 0.75% b.w. of vinyltrimethoxysilane units.

The procedure used for Dispersion 1 was followed but for the following changes: The delay addition vinyl acetate amount was 1137 g and the methyl methacrylate was replaced by 288 g of isobornyl acrylate. The amount of sodium persulfate solution and sodium erythorbate solution used was 253 g of each.

The physical properties of the resultant latex were:

| | |
|---|---|
| % non-volatile | 50.9 |
| Tg | 19.2° C. |
| Viscosity | 149 cps (Brookfield LVF viscometer 60 rpm, 23° C.) |
| pH | 4.8 |
| coagulum | <0.04% (100 mesh screen) |

Dispersion 3:

An emulsifier-stabilized vinyl acetate ethylene copolymer dispersion was prepared with 79% b.w. vinyl acetate units, 9% b.w. ethylene units, 10% b.w. isobornyl acrylate units, 0.75% b.w. acrylic acid units, 0.5 b.w. AMPS units and 0.75% b.w. of vinyltrimethoxysilane units.

The procedure used for Dispersion 1 was followed but for the following changes: The methyl methacrylate was replaced by 192 g of isobornyl acrylate. The amount of sodium persulfate solution and sodium erythorbate solution used was 242 g of each.

The physical properties of the resultant latex were:

| | |
|---|---|
| % non-volatile | 51.5 |
| Tg | 18.1° C. |
| Viscosity | 137 cps (Brookfield LVF viscometer 60 rpm, 23° C.) |
| pH | 4.9 |
| coagulum | <0.04% (100 mesh screen) |

Comparative Dispersion 4:

An commercially available emulsifier-stabilized styrene acrylate copolymer dispersion with Tg=−8° C. (Rhoplex P-308, dispersion for paper coating of Dow Chemical) was used.

Comparative Dispersion 5:

An commercially available emulsifier-stabilized vinyl acetate ethylene copolymer dispersion with triallyl cyanurate units (Vinnapas 100 HS of Wacker Chemical Corp.) was used.

Comparative Dispersion 6:

An emulsifier-stabilized vinyl acetate ethylene copolymer dispersion was prepared with 89 b.w. vinyl acetate units, 9% b.w. ethylene units, 0.75% b.w. acrylic acid units, 0.5% b.w.

AMPS units, and 0.75% b.w. of vinyltrimethoxysilane units. No monomer c) were copolymerized.

The procedure used for Dispersion 1 was followed but for the following changes: The delay addition vinyl acetate amount was 1425 g and no methyl methacrylate was used. The amount of sodium persulfate solution and sodium erythorbate solution used was 166 g of each.

The physical properties of the resultant latex were:

| % non-volatile | 54.3 |
|---|---|
| Tg | 14.3° C. |
| Viscosity | 151 cps (Brookfield LVF viscometer 60 rpm, 23° C.) |
| pH | 4.9 |
| coagulum | <0.01% (100 mesh screen) |

Comparative Dispersion 7:

An emulsifier stabilized vinyl acetate ethylene copolymer dispersion was prepared with 79.75% b.w. vinyl acetate units, 9% ethylene units, 10% b.w. isobornyl acrylate units, 0.5% b.w. AMPS units and 0.75 b.w. acrylic acid units. No vinyl trimethoxy silane was copolymerized.

The procedure used for Dispersion 1 was followed but for the following changes: The methyl methacrylate was replaced by 192 g of isobornyl acrylate and Geniosil XL10 was removed. The amount of sodium persulfate solution and sodium erythorbate solution used was 220 g of each.

The physical properties of the resultant latex were:

| % non-volatile | 52.4 |
|---|---|
| Tg | 16.0° C. |
| Viscosity | 311 cps (Brookfield LVF viscometer 60 rpm, 23° C.) |
| pH | 5.0 |
| coagulum | <0.01% (100 mesh screen) |

Dispersion 8:

An emulsifier-stabilized vinyl acetate ethylene copolymer dispersion was prepared with 79% b.w. vinyl acetate units, 9% b.w. ethylene units, 10% b.w. methyl methacrylate units, 0.75% b.w. acrylic acid units, 0.5% b.w. AMPS units and 0.75% b.w. of vinyltrimethoxy silane units.

The procedure used for Dispersion 1 was followed but for the following changes: The delay addition vinyl acetate amount was 1233 g. The methyl methacrylate addition was made separate from the vinyl acetate. A delay addition of 192 g methyl methacrylate was begun after completion of the vinyl acetate delay and this methyl methacrylate addition was made over a 30 minute period. The amount of sodium persulfate solution and sodium erythorbate solution used was 195 g of each.

The physical properties of the resultant latex were:

| % non-volatile | 53.3 |
|---|---|
| Tg | 19.2° C. |
| Viscosity | 119 cps (Brookfield LVF viscometer 60 rpm, 23° C.) |
| pH | 4.8 |
| coagulum | <0.01% (100 mesh screen) |

Dispersion 9:

An emulsifier-stabilized vinyl acetate ethylene copolymer dispersion was prepared with 79% b.w. vinyl acetate units, 9% b.w. ethylene units, 10% b.w. vinyl chloride units, 0.75% b.w. acrylic acid units, 0.5% b.w. AMPS units and 0.75% b.w. of vinyltrimethoxy silane units.

The procedure used for Dispersion 1 was followed but for the following changes: The methyl methacrylate was removed and an additional feed of 192 g of vinyl chloride was made. The amount of sodium persulfate solution and sodium erythorbate solution used was 194 g of each.

The physical properties of the resultant latex were:

| % non-volatile | 53.6 |
|---|---|
| Tg | 19.1° C. |
| Viscosity | 79 cps (Brookfield LVF viscometer 60 rpm, 23° C.) |
| pH | 4.8 |
| coagulum | <0.01% (100 mesh screen) |

Comparative Dispersion 10:

An emulsifier-stabilized vinyl acetate ethylene copolymer dispersion was prepared with 79% b.w. vinyl acetate units, 9% b.w. ethylene units, 10% b.w. VeoVa 9® units, 0.75% b.w. acrylic acid units, 0.5% b.w. AMPS units and 0.75% b.w. of vinyltrimethoxy silane units. No monomer c) was copolymerized.

The procedure used for Dispersion 1 was followed but for the following changes: The methyl methacrylate was replaced by 192 g of VeoVa 9®. The amount of sodium persulfate solution and sodium erythorbate solution used was 224 g of each.

The physical properties of the resultant latex were:

| % non-volatile | 52.1 |
|---|---|
| Tg | 12.6° C. |
| Viscosity | 42 cps (Brookfield LVF viscometer 60 rpm, 23° C.) |
| pH | 4.9 |
| coagulum | <0.01% (100 mesh screen) |

Comparative Dispersion 11:

An emulsifier-stabilized vinyl acetate ethylene copolymer dispersion was prepared with 79% b.w. vinyl acetate units, 9% b.w. ethylene units, 10% b.w. n-butyl acrylate units, 0.75% b.w. acrylic acid units, 0.5% b.w. AMPS units and 0.75 b.w. of vinyltrimethoxy silane units. No monomer c) was copolymerized).

The procedure used for Dispersion 1 was followed but for the following changes: The methyl methacrylate was replaced by 192 g of isobornyl acrylate. The amount of sodium persulfate solution and sodium erythorbate solution used was 290 g of each.

The physical properties of the resultant latex were:

| % non-volatile | 50.7 |
|---|---|
| Tg | 6.9° C. |
| Viscosity | 47 cps (Brookfield LVF viscometer 60 rpm, 23° C.) |
| pH | 4.8 |
| coagulum | <0.01% (100 mesh screen) |

Comparative Dispersion 12:

An emulsifier-stabilized vinyl acetate ethylene copolymer dispersion was prepared with 79% b.w. vinyl acetate units, 9% b.w. ethylene units, 10% b.w. 2-ethylhexyl acrylate units, 0.75% b.w. acrylic acid units, 0.5% b.w. AMPS units and 0.75% b.w. of vinyltrimethoxy silane units. No monomer c) was copolymerized).

The procedure used for Dispersion 1 was followed but for the following changes: The methyl methacrylate was replaced by 192 g of 2-ethyl hexyl acrylate. The amount of sodium persulfate solution and sodium erythorbate solution used was 285 g of each.

The physical properties of the resultant latex were:

| | |
|---|---|
| % non-volatile | 50.5 |
| Tg | 5.0° C. |
| Viscosity | 78 cps (Brookfield LVF viscometer 60 rpm, 23° C.) |
| pH | 4.9 |
| coagulum | <0.01% (100 mesh screen) |

Comparative Dispersion 13:

An emulsifier-stabilized vinyl acetate ethylene copolymer dispersion was prepared with 79% b.w. vinyl acetate units, 9% b.w. ethylene units, 10% b.w. vinyl laurate units, 0.75% b.w. acrylic acid units, 0.5% b.w. AMPS units and 0.75% b.w. of vinyltrimethoxy silane units. No monomer c) was copolymerized.

The procedure used for Dispersion 1 was followed but for the following changes: The methyl methacrylate was replaced by 192 g of vinyl laurate. The amount of sodium persulfate solution and sodium erythorbate solution used was 264 g of each.

The physical properties of the resultant latex were:

| | |
|---|---|
| % non-volatile | 51.0 |
| Tg | 3.7° C. |
| Viscosity | 58 cps (Brookfield LVF viscometer 60 rpm, 23° C.) |
| pH | 4.9 |
| coagulum | <0.01% (100 mesh screen) |

Comparative Dispersion 14:

An emulsifier-stabilized vinyl acetate ethylene copolymer dispersion was prepared with 69% b.w. vinyl acetate units, 9% b.w. ethylene units, 20% b.w. VeoVa 10® units, 0.75% b.w. acrylic acid units, 0.5% b.w. AMPS units and 0.75% b.w. of vinyltrimethoxy silane units. No monomer c) was copolymerized.

The procedure used for Dispersion 1 was followed but for the following changes: The methyl methacrylate was replaced by 384 g of VeoVa 10® and the delay vinyl acetate addition was 1041 g. The amount of sodium persulfate solution and sodium erythorbate solution used was 225 g of each.

The physical properties of the resultant latex were:

| | |
|---|---|
| % non-volatile | 52.6 |
| Tg | 4.7° C. |
| Viscosity | 61 cps (Brookfield LVF viscometer 60 rpm, 23° C.) |
| pH | 5.0 |
| coagulum | <0.01% (100 mesh screen) |

Testing:

The inventive polymer dispersions and the comparative dispersions were tested in the following paper coating composition:

60 parts by weight of CaCO$_3$ (Hydrocarb 90 of OMYA)
40 parts by weight of Clay (Hydragloss 91 of KaMin LLC)
32 parts by weight of polymer dispersion (50% solids)
0.1 parts by weight of dispersing agent (Dispex N-40 of BASF)
0.8 parts by weight of Ca-Stearate (Suncote 455 Of Sequa Chemicals)
0.1 parts by weight of defoamer (Foamaster 223 of BASF)

After admixture of the ingredients of the paper coating composition the pH was adjusted to pH=8.5 to 9.0 with the addition of NaOH. The solids content of the paper coating composition was adjusted to 64.5 to 65.5% solids. With a thickener (Viscolex AT-90 of BASF) the viscosity was adjusted to 2000-3000 cPs (Brookfield RV viscosity at 23° C. and 20 rpm, #4 spindle).

The formulations were coated onto a solid bleach sulfate (SBS) paperboard surface using an RK-303 automated drawdown coater with a No. 0 wire wound K metering bar (R K Print Coat Instruments Ltd) at a coat weight of 5.0 to 6.0 lbs./3000 ft$^2$ (8.1 to 9.8 g/m$^2$) and dried in an oven for 90 seconds at 250° F. (121° C.).

Test Methods:

Paper binding strength was measured with an IGT Test Instrument, which measures the pick strength of a coated paper surface. The method is described in IGT Information Leaflet W70.

IGT Wet Pick Strength:

During the offset printing process, water as well as printing ink are transferred at high speeds to a coated paper/paperboard surface. The interaction of the water and ink on the coated surface can affect the strength of the coating. For example, water can penetrate the coated surface and weaken the coating prior to the transfer of ink such that coating particles can be pulled from the coated surface due to the tack forces of the ink. This phenomenon is known as wet pick.

Wet pick is evaluated with the use of an IGT pick tester manufactured by IGT/Reprotest of Amsterdam, the Netherlands. The procedure for performing the evaluation is documented in the IGT informational leaflet W32. The IGT Wet Pick test applies a thin film of water to a portion of a coated paper/paperboard surface via a rotating disk followed immediately by the application of a thin film of a standard ink to the wetted and non-wetted areas of the same coated paper/paperboard sample. If wet pick occurs, coating particles are pick off the water wetted portion of coated paper/paperboard sample and transferred to portion of the ink printing disk. A second sample of the same coated paper paperboard is then printed with disk having the picked coating particles. After printing the second sample, ink density measurements are taken on the printed area without the picked coating particle and also on the printed area having the pick coating particles. The wet pick is determined as a percentage difference in the ink density between the two printed areas.

A higher IGT wet pick percentage value indicates greater disruption of the coated paper/paperboard surface due to water which indicates a weaker coating.

In this work the IGT Wet Pick instrument was run at a constant speed of 2 meters/second and a printing force pressure of 625 Newtons.

The test results are shown in Table 1.

The results demonstrate that only copolymers including both comonomer units c) and d) provided suitable wet pick resistance. Without comonomer units d) (comparative dispersion 7) or without comonomer units c) (comparative dispersions 6 and 10-14), wet pick strength was insufficient.

TABLE 1

| Dispersion or Comparative Dispersion | IGT Wet Pick [%] |
|---|---|
| Dispersion 1 | 0.0 |
| Dispersion 2 | 0.0 |
| Dispersion 3 | 0.0 |
| Comparative Dispersion 4 | 0.0 |
| Comparative Dispersion 5 | 61.2 |
| Comparative Dispersion 6 | 51.2 |
| Comparative Dispersion 7 | 56.7 |
| Dispersion 8 | 0.0 |

TABLE 1-continued

| Dispersion or Comparative Dispersion | IGT Wet Pick [%] |
|---|---|
| Dispersion 9 | 0.8 |
| Comparative Dispersion 10 | 16.8 |
| Comparative Dispersion 11 | 30.3 |
| Comparative Dispersion 12 | 22.6 |
| Comparative Dispersion 13 | 21.9 |
| Comparative Dispersion 14 | 41.0 |

The invention claimed is:

1. A polymer dispersion for paper coating compositions, obtainable by means of a radically initiated, aqueous emulsion polymerization in the presence of one or more emulsifiers and optionally protective colloids, without the use of seed latex, of
 a) 50 to 93% by weight of at least one vinyl ester of an alkanoic acid with 1 to 12 C-atoms, whose homopolymer has a glass transition temperature $T_g$ of below about 350K (78° C.), according to ASTM D3418-82 at a heating rate of 10K (10° C.) per minute, taking the midpoint temperature as $T_g$,
 b) 2 to 30% by weight of ethylene,
 c) 5 to 20% by weight of at least one monomer whose homopolymer has a glass transition temperature $T_g$ of at least about 350K (78° C.), according to ASTM D3418-82 at a heating rate of 10K (10° C.) per minute, taking the midpoint temperature as $T_g$,
 d) 0.1 to 2% by weight of ethylenically unsaturated silane monomers,
 e) 0 to 5% by weight of further ethylenically unsaturated monomers different from monomers c) or d) that are copolymerizable with vinyl acetate and ethylene,
 based in each case on the total weight of the monomers used for the polymerization, with the data in % by weight summing in each case to 100% by weight.

2. The polymer dispersion according to claim 1, wherein a) comprises one or more vinyl esters selected from the group consisting of vinyl propionate, vinyl valerate, vinyl 2-ethylhexanoate, vinyl laurate and vinyl versatates.

3. The polymer dispersion according to claim 1, wherein a) comprises vinyl acetate.

4. The polymer dispersion according to claim 1, wherein c) comprises one or more monomers selected from the group consisting of vinyl esters, acrylic acid esters, methacrylic acid esters, vinyl chloride and styrene.

5. The polymer dispersion according to claim 1, wherein d) comprises one or more monomers selected from the group consisting of 3-acryloyl- and 3-methacryloyloxypropyltri-(alkoxy)silanes, vinylalkyldialkoxysilanes and vinyltrialkoxysilanes, wherein the alkoxy groups comprise $C_1$ to $C_{12}$ alkoxy groups and the alkyl radicals are $C_1$ to $C_3$ alkyl radicals.

6. A paper coating composition comprising pigments and the polymer dispersion according to claim 1, wherein the polymer constitutes from 1 to 50% by weight of the solids in the composition, and the pigment(s) constitute(s) from 50 to 99% by weight of the solids in the composition.

7. A process for preparing a polymer dispersion, comprising radically initiated, aqueous emulsion polymerization, without the use of seed latex, in the presence of one or more emulsifiers and optionally protective colloids, of
 a) 50 to 93% by weight of at least one vinyl ester of an alkanoic acid with 1 to 12 C-atoms, whose homopolymer has a glass transition temperature $T_g$ below about 350K (78° C.), according to ASTM D3418-82 at a heating rate of 10K (10° C.) per minute, taking the midpoint temperature as $T_g$,
 b) 2 to 30% by weight of ethylene,
 c) 5 to 20% by weight of at least one monomer whose homopolymer has a glass transition temperature $T_g$ of at least about 350K (78° C.), according to ASTM D3418-82 at a heating rate of 10K (10° C.) per minute, taking the midpoint temperature as $T_g$,
 d) 0.1 to 2% by weight of ethylenically unsaturated silane monomers,
 e) 0 to 5% by weight of further ethylenically unsaturated monomers different from monomers c) or d) that are copolymerizable with vinyl acetate and ethylene,
 based in each case on the total weight of the monomers used for the polymerization, with the data in % by weight summing in each case to 100% by weight;
 wherein at least a part of the emulsifiers and/or protective colloids, and at least a part of the comonomers a), b), c), d) and e) is added initially, and the reaction mixture is heated and polymerization is initiated by metering initiator components, and the remaining part of the comonomers is added during polymerization.

8. A paper coating composition comprising the polymer dispersion according to claim 1.

* * * * *